Sept. 22, 1942.   J. A. J. BENNETT   2,296,251
AIRCRAFT WITH SUSTAINING ROTORS
Filed Aug. 23, 1940
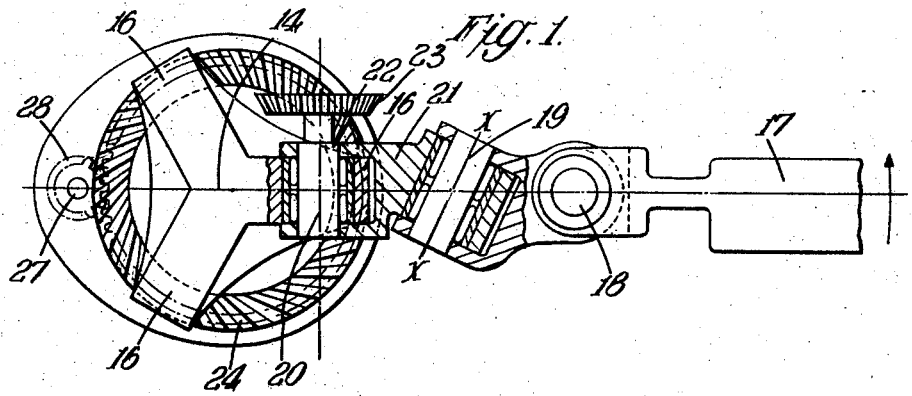
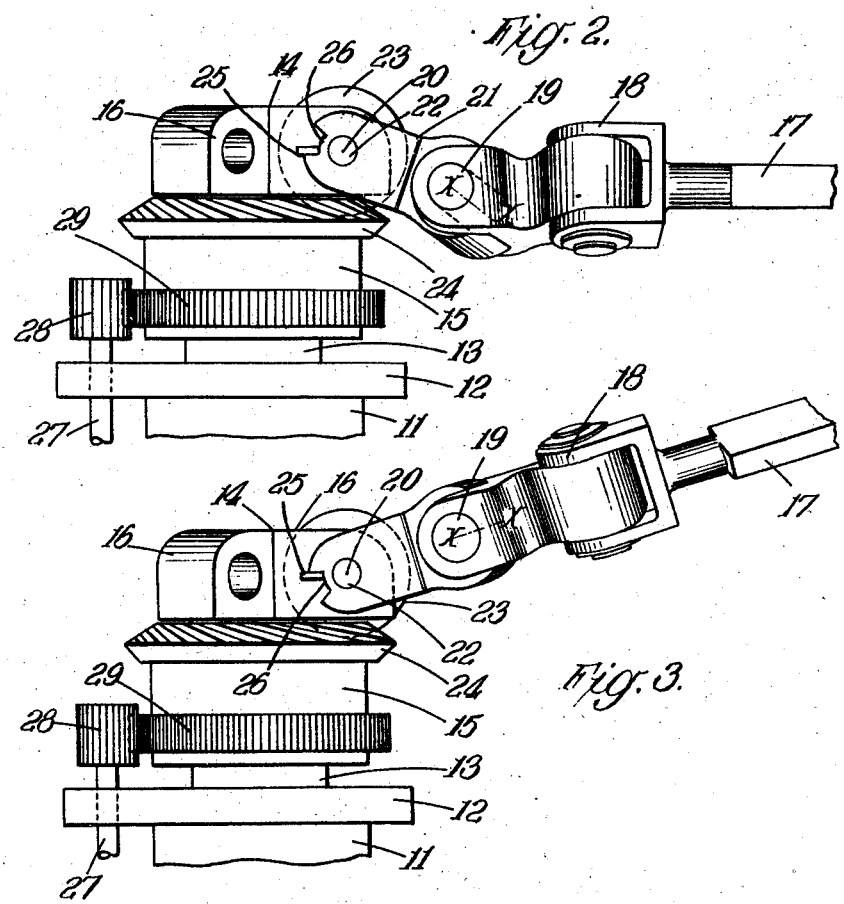
INVENTOR
James Allan Jamieson Bennett
ATTORNEYS

UNITED STATES PATENT OFFICE 2,296,251

AIRCRAFT WITH SUSTAINING ROTORS

James Allan Jamieson Bennett, Esher, England, assignor to Autogiro Company of America, Willow Grove, Pa., a corporation of Delaware Application August 23, 1940, Serial No. 353,807
In Great Britain December 1, 1938

12 Claims. (Cl. 244—18)

This invention relates to rotaplanes, i. e. aircraft sustained in normal flight wholly or principally by the axial thrust of an autorotative rotor (or rotors), and is especially concerned with devices for obtaining a so-called "jump-start" or "direct take-off", in which the rotor is power driven before taking-off to a considerably higher speed than that utilised in flight, for which purpose the blade angle is markedly decreased, preferably to the no-lift value, and the stored energy utilised to produce a direct lift by increasing the blade angle to the normal value or greater concurrently with cessation of the power drive, e. g. by disengagement of a clutch.

It has been proposed to cause the blade angle to vary automatically as required for this purpose by articulating each blade to the hub by the combination of a flapping or "delta" ($\delta$) pivot with its axis acutely inclined to the blade axis on the leading side of the latter and a drag or "alpha" ($\alpha$) pivot with its axis making an acute angle with the rotational axis when projected on a plane perpendicular to the blade axis, and applying the drive to the intermediate member of the compound $\delta$, $\alpha$ joint by means of an independent driving member floating with reference to the hub and coaxial therewith, together with appropriate connections, e. g. a system of leverages.

In the present invention the required automatic variation of blade angle is obtained by the combination of two delta pivots ($\delta_1$ and $\delta_2$) one at least of which has its axis acutely inclined to the blade axis, and applying the drive to the intermediate member of the compound $\delta_1$, $\delta_2$ joint by means of an independent driving member floating with reference to the hub and coaxial therewith, together with appropriate connections, which may include a system of leverages or system of gears. The axis of the "alpha" or drag pivots may be in a plane perpendicular to the blade axis and making an acute angle with the rotational axis as specified in my United States Patent No. 2,121,536 or any other form of damped drag pivot may be used.

One form of the invention is illustrated by the accompanying diagrammatic drawing, of which:

Fig. 1 is a part sectional plan view of the head of a three-bladed rotor showing part of one blade and its connection to the head;

Fig. 2 is a corresponding side elevation showing the positions occupied by the parts during driving of the rotor prior to take-off; and Fig. 3 is a further side elevation showing the positions occupied by the parts during flight.

In the drawing:

The upper part of the pylon or other rotor supporting structure, indicated generally at 11, has a flange 12, above which there extends a mast portion 13 which supports the rotor head proper, indicated at 14, and a floating drive member 15. The rotor head 14 and the floating drive member 15 are both mounted for rotation upon the mast 13, upon bearings which are not illustrated as they form no part of the invention as such; said mountings may be of any appropriate type. The rotor head 14 has three apertured radial lugs 16 with which the three blades respectively are connected about horizontal axes. As shown in the case of one blade, 17, the connection with the rotor head 14 comprises a lead-lag or $\alpha$ pivot 18 and two flapping or $\delta$ pivots 19 and 20 respectively, these latter being inclined to one another, as shown clearly in Fig. 1. The link indicated at 21, joining the two $\delta$ pivots 19 and 20 is fast on the pin 22 of the pivot 20 which pin 22 has also fast thereon a gearwheel 23, the teeth of which mesh with those of a crown wheel 24 carried by and rotatable as one with the floating drive member 15. Angular movement of the link 21 about the pivot 20 is limited by a stop 25, Figs. 2 and 3, on the lug 16 with which the link 21 cooperates at the ends of a notch 26 formed for the purpose therein. For driving the rotor, a drive shaft 27, journalled near its upper end in the flange 12 of the supporting structure 11, has fast thereon a pinion 28 which meshes with gear teeth 29 formed on the drive member 15.

The direction of rotation is as indicated by the arrow in Fig. 1, the drive being imparted to the rotor, as will be apparent, via the gearing 23, 24 and the link 21. The gearing 23, 24 is such that rotation of the drive member 15 will move the link 21 in a clockwise direction as far as permitted by the stop 25 to the position shown in Fig. 2, and as a result, owing to the mutual inclination of the $\delta$ pivots 19 and 20, the pitch angle of the blades will be decreased to a value determined by the inclinations of the two $\delta$ pivots and by the position of the stop 25. In practice this decreased blade pitch angle will be substantially zero.

When, the rotor speed having reached an appropriately high value, the drive thereto is terminated, movement of the link 21 in an upward direction takes place automatically under the influence of centrifugal force, and thus the blade pitch angle is increased automatically, the parts assuming positions as shown in Fig. 3 during flight.

In the arrangement shown the outer δ pivot 19 is inclined and the inner δ pivot 20 is at right angles to the longitudinal axis of the blade 17. The inclined pivot 19 is also indicated by x—x in order that its position may be clearly distinguished.

In a modification the inclination of the axes of the two δ pivots to one another is small so that it is necessary to rotate the link between them through an obtuse angle to obtain the required change of blade pitch angle.

It will be apparent that means other than those shown, e. g. a system of levers, may be employed for shifting the link about the inner δ pivot. Further, in some cases only the position of the link for substantially zero blade pitch angle may be determined by a stop, the inclinations of the two δ pivots being chosen appropriately.

It is to be noted that with an arrangement according to the invention, the blades may assume temporarily upon cessation of drive to the rotor pitch angles greater than during normal autorotative functioning of the rotor during flight. During driving of the rotor prior to take-off, there is substantially zero lift and the coning angle of the blades is zero. When the drive ceases, the blades assume positions giving the above mentioned greater pitch angles and upon the subsequent coning up of the blades normal pitch angles obtain. The coning up of the blades reduces the pitch angle if $\Delta\theta/\Delta\beta O$ is negative; where $\Delta\theta$=blade angle increment and $\Delta\beta O$=coning angle increment, that is, if the inner δ pivot is inclined outwardly on the leading side of the blade.

Attention is called to the fact that the multiple blade pivot arrangements disclosed herein are also disclosed in my copending application Serial No. 353,808, filed August 23, 1940, wherein said multiple blade pivot arrangements per se, and in association with means acting on the intermediate pivot link to change the blade pitch, are claimed.

What I claim is:

1. In a rotaplane as set forth, and for obtaining variation of blade pitch angle for direct take-off, the combination of blade connections to the rotor hub including two flapping pivots, one at least of which has its axis acutely inclined to the blade axis with means including an independent floating drive member for applying rotor driving torque to intermediate members uniting the two flapping pivots of each blade, respectively, whereby the transmission of driving torque to the rotor effects movement about said flapping pivots with consequent change of blade pitch angle.

2. In a rotaplane as set forth, and for obtaining variation of blade pitch angle for direct take-off, the combination of blade connections to the rotor hub including two flapping pivots which are inclined to one another with means including an independent floating drive member for applying rotor driving torque to intermediate members uniting the two flapping pivots of each blade, respectively, whereby the transmission of driving torque to the rotor effects movement about said flapping pivots with consequent change of blade pitch angle.

3. In a rotaplane as set forth, mechanism for automatically varying the blade pitch angle concurrently with disconnection of the rotor drive for direct take-off, and comprising the combination of a blade mounting system in which each blade is articulated to the hub by means of two flapping pivots, one at least of which has its axis acutely inclined to the blade axis, with rotor driving means applying the driving effort to an intermediate member uniting said pivots through the medium of an independent floating drive member disposed coaxially of the hub.

4. In a rotaplane as set forth, mechanism for automatically varying the blade pitch angle concurrently with disconnection of the rotor drive for direct take-off, and comprising the combination of a blade mounting system in which each blade is articulated to the hub by means of two flapping pivots, one at least of which has its axis acutely inclined to the blade axis, with rotor driving means applying the driving effort to an intermediate member uniting said pivots through the medium of an independent floating drive member disposed coaxially of the hub, said combination including gear connections between a rotor drive shaft and the independent floating drive member.

5. In a rotaplane as set forth, mechanism for automatically varying the blade pitch angle concurrently with disconnection of the rotor drive for direct take-off, and comprising the combination of a blade mounting system in which each blade is articulated to the hub by means of two flapping pivots, one at least of which has its axis acutely inclined to the blade axis, with rotor driving means applying the driving effort to an intermediate member uniting said pivots through the medium of an independent floating drive member disposed coaxially of the hub, said combination including connections including levers between a rotor drive shaft and the independent floating drive member.

6. In a rotaplane as set forth, mechanism for automatically varying the blade pitch angle concurrently with disconnection of the rotor drive for direct take-off, and comprising the combination of a blade mounting system in which each blade is articulated to the hub by means of two flapping pivots, one at least of which has its axis acutely inclined to the blade axis, with rotor driving means applying the driving effort to an intermediate member uniting said pivots through the medium of an independent floating drive member disposed coaxially of the hub, said combination including stops limiting the extent to which each intermediate member can move about the corresponding inner flapping pivot.

7. In a rotaplane as set forth, mechanism for automatically varying the blade pitch angle concurrently with disconnection of the rotor drive for direct take-off, and comprising the combination of a blade mounting system in which each blade is articulated to the hub by means of two flapping pivots, one at least of which has its axis acutely inclined to the blade axis, with rotor driving means applying the driving effort to an intermediate member uniting said pivots through the medium of an independent floating drive member disposed coaxially of the hub, said combination including stops limiting the extent to which each intermediate member can move about the corresponding inner flapping pivot, whereby the position of said intermediate members, respectively, corresponding to substantially zero blade pitch angle is determined.

8. In a rotaplane as set forth, mechanism for automatically varying the blade pitch angle concurrently with disconnection of the rotor drive for direct take-off, and comprising the combination of a blade mounting system in which each blade is articulated to the hub by means of two flapping pivots, one at least of which has its axis acutely inclined to the blade axis, with rotor driving means applying the driving effort to an intermediate member uniting said pivots through the medium of an independent floating drive member disposed coaxially of the hub, said combination including stops limiting the extent to which each intermediate member can move about the corresponding inner flapping pivot, whereby the position of said intermediate members, respectively, corresponding to maximum blade pitch angle appropriate to the high initial rotor speed is determined.

9. For an aircraft having a pivoted blade sustaining rotor, for each blade, a pair of pivots with their axes positioned to provide for blade swinging movement in the same general direction, the axes of said two pivots being somewhat inclined with respect to each other and the axis of at least one of said pivots being inclined with reference to a plane perpendicular to the blade axis to provide for conjoint swinging and pitch change movement of the blade about said one pivot axis, and mechanism for driving the rotor including drive means coupled with a blade pivot member and providing for pivotal blade movement in a sense to alter the blade pitch.

10. For an aircraft having a pivoted blade sustaining rotor, a hub, for each blade a pair of blade mounting pivots one of which is radially offset from the other, the pivots being arranged to effect pitch change movement of the blade upon compound movement thereof about the axes of said pivots, and rotor drive mechanism operative upon transmission of torque to the rotor blades to effect compound blade movement about said pivot axes.

11. A construction in accordance with claim 10 in which the major component of movement of the blade about each of said pivots is in the flapping sense.

12. For an aircraft having a pivoted blade sustaining rotor and a disconnectible drive, for each blade, a pair of pivots with their axes positioned to provide for blade movement generally in the flapping sense, the axis of at least one of said pivots being so positioned as to introduce a component of pitch change movement of the blade, and means for transmitting the driving torque to the rotor blades in a manner establishing different blade pitch positions as between the condition of power drive and free rotation.

JAMES ALLAN JAMIESON BENNETT.